Figure 1:
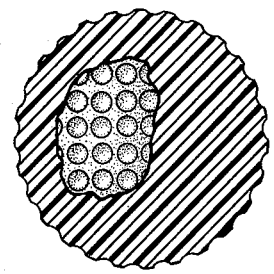

March 1, 1966  R. C. KOHRN  3,238,156
GOLF BALL AMD METHOD OF MAKING SAME
Filed Oct. 4, 1962

INVENTOR.
ROBERT C. KOHRN

United States Patent Office

3,238,156
Patented Mar. 1, 1966

3,238,156
GOLF BALL AND METHOD OF MAKING SAME
Robert C. Kohrn, South Bend, Ind., assignor to United States Rubber Company, New York, N.Y., a corporation of New Jersey
Filed Oct. 4, 1962, Ser. No. 231,877
9 Claims. (Cl. 260—2.5)

This invention relates to a new and improved golf ball and to a method for making the same. More particularly, this invention is directed to a novel, inexpensive and simply produced golf ball comprising a molded and cured homogeneous mixture of an elastomer and resin microballoons.

The present invention is a continuation-in-part of the application of Robert C. Kohrn, Golf Ball and Method of Making Same (Serial No. 704,857, filed on December 17, 1957), now abandoned.

The prior art contains many references disclosing methods of making golf balls. These references teach that golf balls may be made by providing a center formed of a yielding material such as a rubber core or a confined fluid, and winding about such a core a rubber tape or thread to form the ball body, which body is ultimately covered with a protective covering such as balata or the like. This rather intricate construction has been thought necessary in order to provide the golf ball with the proper flight characteristics. U.S. Patents 2,344,873; 2,354,017; 2,319,163; and 2,360,090 all exemplify the prior art methods of making golf balls.

Whether the golf ball be provided with a rubber core or a fluid core about which is wound the rubber thread, such construction is expensive. When a liquid or fluid center is used, the liquid has to be confined in some sort of envelope which further adds to the cost of manufacture. Further, with prior art golf balls it has always been necessary to cover the wound core with a protective covering. This separate operation adds to the complexities of the process and, of course, to the expense.

It is an object of my invention to provide a golf ball which is capable of exhibiting the flight characteristics similar to golf balls having a rubber or liquid core. Another object of my invention is to provide a golf ball which, when struck with a golf club, provides the authentic "click" or "crack" sound that is produced when using a prior art golf ball having a rubber or liquid core. A further object of my invention is to provide a golf ball that has a uniformly homogeneous microstructure throughout. A further object of my invention is to provide a golf ball requiring no outer protective cover. In other words, the composition utilized in the golf ball is sufficiently impact resistant and rugged to withstand the impact of the golf club, thereby obviating the need for a scuff-resistant protective cover (although such a cover could be provided, if desired).

Broadly speaking, this invention comprises the use of a cured elastomer in conjunction with resin microballoons as a composition for a golf ball. More specifically, the present invention contemplates a golf ball, resembling conventional golf balls in all respects essential to the golfer, which is inexpensively prepared by a method (for other than polyurethane elastomers) comprising the steps of (1) preparing a solution or suspension of an elastomer, (2) homogeneously interspersing thermoset or high melting thermoplastic resin microballoons into the solution or suspension, (3) coagulating and drying the resulting mixture, and (4) then molding and curing the mixture so as to produce a golf ball which is substantially homogeneous.

Figure 2:
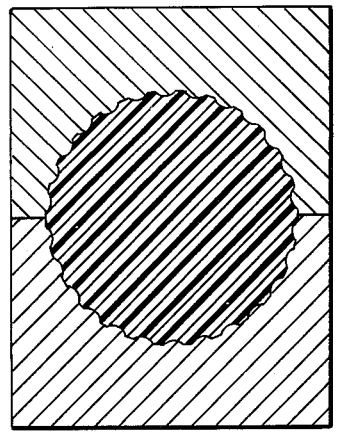

The accompanying drawings may be summarized as follows:

FIG. 1 is a front elevation, partially in section, of a dimpled golf ball made in accordance with my invention;
FIG. 2 is a schematic view of the mold used to make the golf balls of my invention.

Although golf balls vary widely in the specific qualities necessary for a good golf ball, it was determined, with an eye toward satisfying the requirements of the U.S. Golfers Association and good golfers, that the golf ball of my invention should have the following minimal qualities:

TABLE A

*Minimal golf ball characteristics*

| | |
|---|---|
| Weight | 660–723 grains. |
| Minimum percent rebound | 60%. |
| Minimum initial velocity | 228 ft. per second. |
| Compression hardness for a 200 lb. load | Minimum deformation of .075 in.; maximum deformation of .300 in. |
| Specific gravity | 1.0–1.2. |
| "Click" sound | Comparable to that of a conventional golf ball when struck by a club. |

The ingredients specified below are adjusted in amount (within the ranges given) so as to produce a golf ball having these qualities.

In order to avoid crushing of the resin microballoons before the molding and curing operation, most of the elastomers useful in this invention must be put in a suspension or solution so that the microballoons may be homogeneously dispersed throughout the elastomer. The polyurethane elastomer is an exception, however. As a fluid pre-polymer at relatively low temperatures, it readily receives the microballoons without the need for the steps of putting the elastomer into a solution or suspension prior to introduction of the microballoons and subsequently removing the solvent or suspending medium from the mixture. It is therefore appropriate to commence a detailed description of the invention by outlining the preparation of the polyurethane elastomer.

In preparing the polyurethane there are involved initially two basic ingredients, an organic polyisocyanate and a poly-functional material, preferably a polyether having terminal alcoholic hydroxyl groups and/or a polyester having terminal alcoholic hydroxyl groups. These two basic materials are generally pre-reacted to provide a liquid material which I call the "pre-polymer."

The polyisocyanates employed in preparing the pre-polymer are generally diisocyanates such as polymethylene diisocyanates (ethylene diisocyanate, hexamethylene diisocyanate); alkylene diisocyanates, such as propylene-1,2-diisocyanate; cycloalkylene diisocyanates, such as 1,4-diisocyanatocyclohexane; and aromatic diisocyanates, such as m- and p-phenylene diisocyanates, toluene diisocyanate, p,p'-diphenyl diisocyanate, etc.

The poly-functional material, or polymer containing terminal alcoholic hydroxyl groups, with which the foregoing polyisocyanate is reacted to provide the liquid pre-polymer, is typically a substantially anhydrous polyether made from a glycol, for example, ethylene glycol or a mixture of glycols. The polyether may be linear or it may be branched, branching being achieved by including in the preparation a trialcohol such as trimethylol propane.

My polyethers are typically polyethers possessing ether linkages (—O—) which are separated by hydrocarbon chains that are either alkyl or aryl in nature. The ether must contain terminal alcoholic hydroxyl groups so that it will be reactive with the polyisocyanate. Usually the polyether is primarily linear and has a melting point of around 55° C. The molecular weight may range from 500 to 5000 (i.e., hydroxyl number of about 225 to 22), but is preferably within the range of 750 to 3500 (i.e., hydroxyl number of about 150 to 32). Examples of polyethers used are polyethylene glycol, polypropylene glycol, poly(propylene-ethylene glycol) and polytetramethylene glycol.

If a polyester is used with or without the polyether, the polyester is typically a polyester made from a glycol, for example, ethylene glycol or a mixture of glycols, and an aliphatic dicarboxylic acid, for example, adipic acid, dimerized linoleic acid, etc., using an excess of glycol over the acid so that the resulting polyester contains terminal alcoholic hydroxyl groups. Such polyester may be linear or it may be branched, the latter effect being achieved by including in the preparation a trialcohol, such as trimethyl propane or trimethylol ethane, or a triacid. Usually an amount of glycol is used as will give a polyester having a hydroxyl number of 225 to 22, and preferably 112 to 37, and a low acid number of less than 6 and preferably less than 1. The molecular weight of the most suitable polyesters may range between the limits of 500 to 5000, but is preferably within the range of 1,000 to 3,000. Many of the useful polyesters are obtained by the esterification of one or more saturated alkyl difunctional acids or acid anhydrides and/or aryl difunctional acids or anhydrides with one or more saturated glycols.

The amount of polyisocyanate that is combined with the polyether and/or polyester in preparing the polyurethane generally ranges from 1.2 to 8.2 equivalents of isocyanate for each equivalent of the total hydorgens reactive to isocyanate which are present in the polyether and/or polyester. More frequently, from 1.5 to 4 moles or mole-equivalents of diisocyanate per mole or mole-equivalent of polyether and/or polyester are used; preferably, about a 3 to 1 ratio. I have found that as the relative amount of diisocyanate is increased, so also is the hardness (crosslinking) of the polyurethane material.

It should be noted that, to yield the pre-polymer, the reaction of the polyether and/or polyester with the polyisocyanate is carried out under substantially moisture-free conditions. Subsequently in my process for producing a golf ball, I add certain ingredients to the pre-polymer, form loose biscuit-shaped slugs slightly heavier than a golf ball from the mixture of liquid pre-polymer and other ingredients, and convert these into a hard but slightly elactomeric slugs by a precure. Added to and mixed with the liquid pre-polymer are microballoons, a curing agent, and, preferably, a catalyst. Water may be the curing agent for the polyurethane, being effective in this regard through its reaction with available terminal isocyanate groups of the pre-polymer. Because the water acts on the pre-polymer, it is not mixed therewith until just before the precure. A suitable catalyst, such as N-methyl morpholine, may be aded with the curing agent to adjust the rate of reaction. The slugs are allowed to stand (precure) at room temperature for about 20 hours during which time a partial cure is achieved. Further curing occurs in the molding operation which immediately follows the precure.

Although polyurethane is a preferred elastomer, other elastomers are also satisfactory, such as cis-1,4-polybutadiene, a 3 to 1 molar ratio (3/1) mixture if cis- and trans-1,4-polybutadiene, and the intermediate mixtures thereof. All skilled in the art are capable of following any of a number of conventional methods for selecting a suitable solvent or suspending medium for an elastomer, putting said elastomer into a solution or suspension therewith, introducing a material into the solution or suspension so that the material becomes uniformly dispersed therein, and then removing the solvent or suspending medium as by evaporation. This operation is not part of the invention, although details thereof will be further elucidated in the examples.

Any of the conventional curative agents for the selected elastomer may be used, including any of the suitable conventional bifunctional curatives and, in the case of the polyurethanes, water or Moca [4,4'-methylene-bis-(2-chloroaniline)].

The other important ingredient of the golf ball, in addition to the elastomer, is the resin microballons. The use of microballoons is an essential element of this invention; surprisingly, the microballoons increase the hardness of the final product without decreasing the rebound significantly. On the other hand, powders of the same resinous material will effect a minor increase in hardness, but decrease the rebound of the final product beyond tolerable limits. Any of the resins mentioned in U.S. 2,797,201 (describing microballoons for use in low density articles) may be used to produce the microballoons useful in the higher density compositions used in the products and process of the present invention by the process explained therein, providing that any of the thermoplastic resins used in the products and process of this invention have a melting point above the temperature at which the elastomer-microballoon mixture is cured. The resin microballoons primarily crush when molded with the elastomer into spherical platelets (fragments which are sections of spheres) rather than a powder. Non-resin microballoons made of glass or clay, such as those shown in U.S. 3,046,172, rupture into a powder during the molding operation and give unacceptable results. Preferentially, the resin is a thermoset aminoplast or phenoplast resin. More particularly, the preferred thermoset resins for use in this invention are the urea-formaldehyde, melamine-formaldehyde, and phenol-formaldehyde resins, especially the first named. Superior golf balls are obtained when the resin microballoons are from about 1 to 100 microns in diameter. Although the microballoons may be used in an amount of form about 5 to about 50 parts by weight per 100 parts of the elastomer, it is preferred that the microballoons be used in an amount of from about 20 to 45 parts by weight per 100 parts of the elastomer.

Microscopic inspection of slices of preferred golf balls of the present invention shows that at least 10% of the resin microballoons remain uncrushed after the curing and molding operation, the remainder of the microballoons primarily having been crushed into spherical platelets. It is important to note that in the process of the invention, upon moderate crushing in the curing operation, the microballoons primarily form spherical platelets rather than a powder. If the microballoons are crushed by themselves, before introduction into the elastomer, a powder is formed. The resulting golf balls have undesirably inferior qualities. It is to be noted that the microballoons should desirably be mixed with the polyurethane elastomer before even partial curing thereof. Otherwise, to effect dispersion of the microballoons in the elastomer, it is necessary to mill a mixture of the two to such an extent that the microballoons are often crushed (before the molding operation) into a powder, a poor final product being the result. However, as is pointed out below, crushing of the microballoons is not always essential (e.g., when a polyurethane elastomer is treated with a Moca curative system).

Although the elastomer and the resin microballoons constitute the essential ingredients of my golf ball, it is also possible to add other materials, such as titanium dioxide ($TiO_2$), to adjust color and weight.

After the prepolymer of polyurethane or the solution or suspension of other elastomers has been prepared, it is combined with the microballoons and further treated as described in the examples below. All parts by weight.

EXAMPLE I

Golf balls were made from the composition of Table 1.

TABLE 1

| | |
|---|---|
| PTMG: Polytetramethylene glycol ether (hydroxyl No. 38; Maximum acid number of 0.15; molecular weight of about 2,800) (also called Teracol 30) | 84.50 |
| TDI: 2,4-toluene diisocyanate | 15.50 |
| N-methyl morpholine (catalyst) | 0.60 |
| Water | 0.26 |
| UFMB: Urea-formaldehyde microballoons (bulk package density, 3.7 pounds per cubic foot; single particle density, 20.0 pounds per cubic foot; average particle size, 0.0013 inch; size range .0039–.000039 inch) | 25.00 |
| $TiO_2$: Titanium dioxide (also called Tipure FF) | 8.00 |

A. *Preparation of 1/3 Teracol 30/TDI (mole ratio) pre-polymer*

The polytetramethylene glycol ether (Teracol 30) is melted in an oven at 60° C. and stirred. The melted polyether is then placed in a jacketed kettle at 60° C., and 5 parts of the 2,4-toluene diisocyanate (TDI) are added. The mixture is stirred for five minutes and then held at 60° C. for one-half hour. The remaining parts of toluene diisocyanate are added, the mixture is stirred for five minutes, and then held at 60° C. for one-half hour. The mixture is then transferred to a storage tank and allowed to cool.

B. *Mixing of pre-polymer and microballoons; curing and molding to produce golf ball*

The pre-polymer is thereafter placed in a dough mixer. N-methyl morpholine (catalyst) and water (curing agent) are added to the mixer and the mixture is stirred for fifteen seconds. The urea-formaldehyde microballoons and $TiO_2$ are added, and the ingredients are mixed for about seven minutes. Slugs slightly heavier than a golf ball are formed from the mixture and allowed to stand at room temperature for about 20 hours (precure). The slugs are then used to fill a series of golf ball molds, one of which is schematically illustrated in FIGURE 2, and pressure sufficient to keep the mold closed is applied. (The molds may be coated with Teflon or other suitable mold-release agents to ensure ease of removal of the finished ball.) The mixture in the mold is cured for fifteen minutes at 160° C. The press is then cooled and opened, the golf balls are removed, and any waste is removed. The golf balls are then stored at room temperature for two days. The golf ball is then essentially completed, any residual seam being removed by buffing, after which paint may be applied.

The resulting standard composition golf ball is tough, impact resistant, and simulates to a remarkable degree the trajectory and flight characteristics of the prior art golf balls having either a solid rubber core or a fluid core. It also provides the authentic "click" or "crack" sound when struck with a golf club. It is comparatively simple to produce and, accordingly, relatively inexpensive.

EXAMPLE II

Golf balls were made from non-polyurethane elastomers and the data obtained thereon are listed in Table 2.

In order to avoid crushing the urea-formaldehyde microballoons, the following procedure was employed which avoids mill mixing thereof. The zinc oxide, MBTS, MBT, DPG, sulfur, and Polygard (as further specified in Table 2) were mill mixed into masterbatches including cis-polybutadiene and a desirable 3 to 1 molar ratio of combination of cis- and trans-polybutadiene. The masterbatches were then dissolved and dispersed in toluene with subsequent blending in of the desired levels of urea-formaldehyde microballoons and stirring. The mixtures were then allowed to stand at room temperature in an open container for 40–60 hours to permit complete evaporation of the toluene. Molding was accomplished by first hand-compressing (forming) the resulting powder-like materials into egg-shaped biscuits of approximate golf ball weight and then compression molding the bicuits in dimpled golf ball molds at 150° C. for 30 minutes.

The time required to completely remove the toluene may be reduced to about 20 hours by coagulating the mixes in ethyl alcohol. In order to achieve this, the final toluene-containing mixes are added slowly to ethyl alcohol and the whole is allowed to stand for about five minutes. The coagulum is recovered in the form of a soft dough which is then spread on a tray to dry for twenty hours at 50° C.

The golf balls made from non-polyurethane elastomers displayed characteristics superior to those of the marginal golf ball.

TABLE 2

| | | |
|---|---|---|
| 3/1 ratio of cis- and trans-polybutadiene | 100 | |
| Cis-polybutadiene | | 100 |
| Urea-formaldehyde microballoons (as in Example 1) | 25 | 40 |
| Zinc oxide | 5 | 5 |
| 2-mercaptobenzothiazole (MBT) | 3 | 3 |
| Mercaptobenzothiazyl disulfide (MBTS) | 1.5 | 1.5 |
| Diphenylguanidine (DPG) | 1.2 | 1.2 |
| Sulfur | 3 | 3 |
| Tri(nonyl-phenyl)phosphite (Polygard) | 3 | 3 |
| Percent rebound | 67 | 69 |
| Initial velocity, ft./sec | 232 | 234 |
| Compression hardness for a 200 lb. load, in | .220–.240 | .220–.240 |

EXAMPLE III

To determine the structure of the urea-formaldehyde microballoons (UFMB) before and after molding, the standard composition of Example I was mixed and specimens were dissolved after 0, 6 and 20, respectively, hours of precure in an open container at room temperature. Golf balls were molded at each precure time increment and the corresponding specimens were dissolved.

A mixture of equal weights of dimethyl sulfoxide and dimethylformamide effectively dissolved the above compositions, resulting in flotation of the whole microballoons and settling of the fractured microballoons. Estimates of the floating whole microballoons were made by visual study. Microscopic examination readily revealed that the floating matter consisted of whole microballoons ranging from 1 to 5 microns in diameter, and that the sedimented matter consisted of spherical platelets (balloon fragments which are sections of spheres). Table 3 describes the precure times and corresponding balloon analysis.

For all precure times studies, when the compositions were not subjected to compression molding, the balloons remained whole. When a ball was molded at zero precure time, the microballoons remained whole. However, when precure had hardened the material to a 30 or 60 Shore "A" hardness (as measured by a Shore "A" durometer) after 6 and 20 hours, respectively, 10% of the microballoons remained whole and 90% were fractured. Apparently crushing or fracturing of the microballoons is an effect of the high pressures exerted in compression molding upon an already very viscous, almost rigid, precured standard composition.

TABLE 3

*UFMB structure in standard compositions*

| Precure Time (hrs.) | Shore "A" hardness | Material treatment | Percent UFMB not crushed |
|---|---|---|---|
| 0 | Soft dough | Molded | 100 |
| 0 | do | Not molded | 100 |
| 6 | 30 | Molded | 10 |
| 6 | 30 | Not molded | 100 |
| 20 | 60 | Molded | 10 |
| 20 | 60 | Not molded | 100 |

EXAMPLE IV

To determine the effect on ball properties when urea-formaldehyde microballoons are employed at levels greater than 25 phr., the use of 40 and 55 phr. of such microballoons was studied.

Table 4 describes the resulting properties of the compositions at the 40 and 55 phr. levels as well as those at the standard composition level of 25 phr. At the 40 phr. level PGA hardness (as measured on a standard Professional Golfers Association tester) increased approximately 25 units with no change in initial velocity or rebound. At the 55 phr. level no further significant changes occurred in PGA hardness; however, rebound, initial velocity, and durability decreased. Balls representing the 55 phr. level were fractured after a single impact blow.

TABLE 4

*Comparative properties of golf balls of various urea-formaldehyde microballoon levels*

| UFMB, phr. | PGA hardness | Rebound, percent | Initial velocity, ft./sec. |
|---|---|---|---|
| 25 | 33 | 72 | 240 |
| 25 | 41 | 73 | 240 |
| 25 | 39 | 73 | 241 |
| 40 | 65 | 73 | 241 |
| 40 | 66 | 72 | 242 |
| 40 | 64 | 73 | 243 |
| 55 | 60 | 68 | 236 |
| 55 | 67 | 69 | 237 |
| 55 | 64 | 67 | 220 |

EXAMPLE V

Table 5 describes the results obtained when polytetramethylene glycols (PTMG) of varying molecular weights (M.W.) were employed in the standard composition. Three samples of PTMG of molecular weights 2910, 1950 and 1640 were converted to prepolymers by reacting them with TDI in a mole ratio of 3/1 TDI/PTMG. The standard composition ball is prepared from a 3/1 TDI/PTMG (molar ratio) prepolymer using toluene diisocyanate (TDI) and Teracol 30 (PTMG, M.W. 2800).

Balls derived from 2910 and 1950 molecular weight PTMG are slightly lower in rebound and initial velocity than the standard composition ball (PTMG, 2800 M.W.). The low PGA hardness properties of these balls are unexpected. The 1640 M.W. PTMG yielded balls having the highest PGA hardness and lowest rebound and initial velocity properties.

TABLE 5

*Comparative properties of golf balls prepared from prepolymers with polytetramethylene glycols of varying molecular weights*

| Molecular weight of PTMG | PGA hardness | Rebound, percent | Initial velocity, ft./sec. |
|---|---|---|---|
| 2,800 (Standard composition) | 19 | 71 | 240 |
|  | 22 | 72 | 239 |
|  | 27 | 71 | 241 |
| 2,910 | 5 | 68 | 237 |
|  | 15 | 67 | 238 |
|  | 0 | 69 | 237 |
| 1,950 | 0 | 70 | 237 |
|  | 8 | 71 | 239 |
|  | 0 | 68 | 235 |
| 1,640 | 21 | 65 | 235 |
|  | 41 | 66 | 236 |
|  | 41 | 65 | 236 |

EXAMPLE VI

Table 6 describes results obtained when Moca [4,4′-methylene-bis-(2-chloroaniline)] at 10 phr. is used as a curative (crosslinking agent) instead of water in the standard composition. Typical properties associated with the water-cured standard composition golf ball of Example I are also included for comparison. Although a precure and a high molding pressure may be used, as with the water curative, in the procedure of this example there was no precure and a hand-operated mold was used, so the UFMB were not crushed.

Essentially no change resulted in initial velocity; rebound was decreased to approximately 66%, and compression-hardness increased by more than 100%.

TABLE 6

*Properties of Moca cured polyurethane balls*

|  | Crosslinking agent, in phr. | PGA hardness | Percent rebound | Initial velocity, ft./sec. |
|---|---|---|---|---|
| Standard (per Example I). | Water 2.5 | 38 | 73 | 240 |
| Moca cured (per Example VI). | Moca 10 | 94 | 65 | 240 |
|  | do | 92 | 66 | 240 |
|  | do | 87 | 66 | 239 |
|  | do | 83 | 65 | 238 |

EXAMPLE VII

A. The experiments reported in Table 7A show that urea-formaldehyde microballoons could not be satisfactorily replaced with a noncellular (powdery, resinous) filler and/or chemically produced cells. Hardness and/or rebound properties were decreased by the substitution.

TABLE 7A

| Experiment No. | 11 | 12 | 13 | 14 | 15 |
|---|---|---|---|---|---|
| Pre-polymer: 1/3 Teracol 30/ TDI | 100 | 100 | 100 | 100 | 100 |
| Urea-formaldehyde microballoons | 25 | | | | |
| Nitrosan (N,N′-dinitroso-N-N′-dimethyl terephthalamide) | | | | 0.007 | |
| Water | 0.26 | | 0.26 | | 0.04 |
| Urea-formaldehyde powder (Beetle molding compound) | | 25 | 25 | 25 | 25 |
| Titanium dioxide | 8 | 8 | 8 | 8 | 8 |
| Moca | | 12 | | 12 | 12 |
| N-methyl morpholine | 0.60 | | 0.60 | | 0.60 |
| PGA hardness | 64 | 43 | 0 | 38 | 0 |
| Rebound (percent) | 72 | 58 | 62 | 37 | 51 |
| Specific gravity | 1.03 | 1.07 | 1.07 | 1.07 | 1.16 |

All deviations from the standard composition of Experiment 11 (corresponding to Example I) resulted in balls which were inferior in both rebound and hardness.

Experiments 12–15 represent balls in which urea-formaldehyde powder was used instead of urea-formaldehyde microballoons. Cellular structure, which is derived from microballoons in the standard composition ball of Experiment 11 (corresponding to Example I), is achieved in Exp. 13–15 with the cell forming agents, Nitrosan and water (the latter reacts with isocyanate to form $NH_2$ and the actual cell forming agent $CO_2$). In view of the chemical similarity between urea-formaldehyde microballoons and urea-formaldehyde powder, the discovery of the poor properties noted in Table 7A was unexpected.

When non-cellular urea-formaldehyde powder and Moca replaced UFMB and water, respectively (as filler and curative, respectively), a cell-free solid ball resulted (Exp. 12).

B. Table 7B shows the results of attempts to replace the urea-formaldehyde microballoons in the standard composition of Experiment 21 (corresponding to Example I) with non-cellular type fillers, polyvinyl alcohol microballoons and micro-cel.

TABLE 7B

| Experiment No | 21 | 22 | 23 | 24 | 25 |
|---|---|---|---|---|---|
| 1/3 Teracol 30/TDI | 100 | 100 | 100 | 100 | 100 |
| Urea-formaldehyde microballoons (1–100 microns in diameter) | 25 | | | | |
| Polyvinyl alcohol microballoons (spherical, 1–100 microns) | | 25 | | | |
| Micro-Cel (Calcium silicate, porous particles, under one micron in diameter) | | | | | 25 |
| Cab-O-Sil (a colloidal silica, solid particle) | | | 25 | | |
| Wood flour (cellulose, pulverized wood) | | | | 25 | |
| Water | 0.26 | 2.50 | 0.26 | 0.26 | 0.26 |
| Titanium dioxide | 8 | 8 | 8 | 8 | 8 |
| N-methyl morpholine | 0.6 | 0.6 | 0.6 | 0.6 | .60 |
| PGA hardness | 55 | 0 | 0 | 0 | 0 |
| Rebound (percent) | 71 | 39 | 55 | 58 | 45 |
| Specific gravity | 1.02 | 1.03 | 1.09 | 1.10 | 1.16 |

In general, balls derived from prepolymer having the 1/4 molar ratio were harder and lower in rebound than corresponding ones derived from pre-polymer having the 1/3 ratio.

Balls derived from urea-formaldehyde microballoons showed superior properties relative to the minimal property limits listed above for golf ball classification (Exp. 31 and 33). A ball prepared from phenol-formaldehyde microballoons showed above-marginal properties. Balls prepared from glass balloons, polyvinyl alcohol, and polyvinyl chloride had low initial velocities, low rebound, and poor compression-hardness characteristics.

Incidentally, Experiment 42 shows that the catalyst is not an essential ingredient of the invention.

The ball of homogeneous microstructure described above may be used as a core for a prior art golf ball or be painted without departing from the spirit and scope of the appended claims.

TABLE 7C

*Properties of golf balls made from various spherical particles and microballoons*

| Experiment No | 31 | 32 | 33 | 34 | 35 | 36 | 37 | 38 | 39 | 40 | 41 | 42 |
|---|---|---|---|---|---|---|---|---|---|---|---|---|
| 1/3 pre-polymer of Teracol 30/TDI | 100 | | 100 | | 100 | 100 | | 100 | | 100 | 100 | 100 |
| 1/4 pre-polymer of Teracol 30/TDI | | 100 | | 100 | | | 100 | | 100 | | | |
| Urea-formaldehyde microballoons | 25 | 25 | 25 | 25 | | | | | | | | 25 |
| Phenol-formaldehyde microballoons | | | | | 25 | | | | | | | |
| Ecospheres (glass balloons) | | | | | | | | | | 25 | | |
| Polyvinyl alcohol micro-balloons | | | | | | | | | | | 25 | |
| Polyvinyl chloride resin beads | | | | | | 25 | 25 | | | | | |
| Polyvinyl alcohol resin beads | | | | | | | | 25 | 25 | | | |
| Moca | | | | | | | | | | | 10 | 10 |
| Water | 0.26 | 0.26 | 0.26 | 0.26 | 0.26 | 0.26 | 0.26 | 0.26 | 0.26 | 0.26 | | |
| N-methyl morpholine | 0.60 | 0.60 | .60 | .60 | 0.60 | 0.60 | 0.60 | 0.60 | 0.60 | 0.60 | 0.60 | |
| Tipure FF | 8 | 8 | 8 | 8 | 8 | 8 | 8 | 8 | 8 | 8 | 8 | 8 |
| PGA hardness | 62 | 72 | 59 | 79 | 19 | 0 | 0 | 0 | 0 | 0 | (¹) | 83 |
| Compression hardness (200 lbs. load) (in.) | 0.137 | 0.117 | 0.132 | 0.116 | 0.226 | 0.590 | | 0.462 | 0.340 | 0.386 | (¹) | 0.092 |
| Specific gravity | 1.15 | 1.09 | 1.02 | 1.14 | 1.00 | 0.90 | | 1.04 | 0.88 | 0.90 | (¹) | 1.11 |
| Initial velocity (ft./sec.) | 239 | 238 | 238 | 239 | 230 | | | 211 | 211 | 204 | (¹) | 236 |
| Rebound (percent) | 73 | 72 | 71 | 71 | 65 | 54 | 54 | 55 | 50 | 42 | (¹) | 66 |
| Weight (grains) | 710 | 655 | 615 | 715 | 625 | 540 | | 620 | 540 | 556 | (¹) | 695 |

¹ Did not cure.

The non-cellular fillers employed in Experiments 23 and 24, yielded balls which were low in PGA hardness. Balls in which urea-formaldehyde microballoons are replaced with low melting polyvinyl alcohol resin microballoons approximated the standard composition ball "click" in sound; however, they were inferior in both rebound and hardness, presumably because the low melting point polyvinyl alcohol microballoons melted at the curing temperature (Exp. 22). Balls derived from Micro-cel, a non-spherical but cellular filler, had sub-marginal properties (Exp. 25).

C. Pre-polymers having Teracol 30/TDI molar ratios of 1/3 or 1/4 were employed with the below spherical particles and microballoons in the experiments described in Table 7C:

(a) Urea-formaldehyde (spherical microballoons, 1–100 microns in diameter) as in the composition
(b) Phenol-formaldehyde (spherical microballoons, 1–100 microns in diameter)
(c) Hollow glass balloons (Ecospheres, 30–125 microns in diameter)
(d) Polyvinyl alcohol (solid beads, 30–150 microns in diameter)
(e) Polyvinyl alcohol (spherical balloons, 1–100 microns in diameter)
(f) Polyvinyl chloride (solid beads, 0.5–20 microns in diameter)

Having thus described my invention, what I claim and desire to protect by Letters Patent is:

1. A golf ball having a minimum rebound of 60% and a compression hardness from about 0.075 to about 0.300 inch for a 200 lb. load, said ball comprising a substantially uniform pressure-molded mixture of
   (1) an elastomer selected from the class consisting of
       (a) polybutadiene rubber, and
       (b) polyurethane reaction products of polyisocyanates with polyfunctional products selected from the group consisting of polyethers, polyesters and mixtures thereof; with
   (2) a filler comprising resin microballoons, said resin being not subject to heat softening at temperatures below the shaping temperature of said golf ball,
       said microballons in said pressure-molded mixture being substantially crushed into the form of spherical platelets.

2. The golf ball of claim 1 wherein said elastomer is a polyurethane reaction product of at least one polyisocyanate with at least one polyfunctional product selected from the group consisting of polyethers, polyesters and mixtures thereof.

3. The golf ball of claim 1 wherein said elastomer is a mixture comprising of from 100 to 75 parts by weight of cis-1,4-polybutadiene and, correspondingly, from 0 to 25 parts by weight of trans-1,4-polybutadiene for each 100 parts of mixture.

4. The golf ball of claim 1 wherein the resin comprising said microballoons is selected from the group consisting of urea-formaldehyde, melamine-formaldehyde, phenol-formaldehyde resins and combinations thereof.

5. The golf ball of claim 1 wherein said microballoons are from about 1 to about 100 microns in diameter and are present in an amount of from about 5 to about 50 parts by weight per 100 parts of said elastomer.

6. A golf ball having a minimum rebound of 60%, a compression hardness from about 0.075 to about 0.300 inch for a 200 lb. load and a minimum initial velocity of 228 ft./sec., comprising a pressure-molded mixture of a cured elastomer and from about 20 to about 45 parts by weight of a filler comprising urea-formaldehyde microballoons per 100 parts of said elastomer, up to about 10% of said microballoons being uncrushed, the remainder thereof being crushed into the form of spherical platelets; said elastomer being a polyurethane polymer of an organic diisocyanate and a polyfunctional compound selected from the group consisting of polyalkylene ether having terminal alcoholic hydroxyl groups and a polyester having terminal alcoholic hydroxyl groups; said resin microballoons being from about 1 to about 100 microns in diameter.

7. The golf ball of claim 6 wherein said organic diisocyanate is toluene diisocyanate; said polyfunctional compound is polytetramethylene glycol ether having a molecular weight of about 2,800 and terminal alcoholic hydroxyl groups; and the molar ratio of said organic diisocyanate to said polyfunctional compound is from about 3/2 to about 4/1.

8. The method of making a golf ball having a minimum rebound of 60% and a compression hardness from about 0.075 to about 0.300 inch for a 200 lb. load comprising the steps of (1) adding a curing agent for polyurethane elastomer to a mixture of polyurethane prepolymer and microballoons prepared from a resin not subject to heat softening at the temperature reached in step (4) hereof; (2) allowing portions of the mixture to partially cure; (3) placing the precured portions in a mold having the dimpled configuration of a golf ball; and (4) applying heat and pressure to thereby cure and mold said resulting mixture and to thereby crush at least substantially 90% of said resin microballoons into spherical platelets and produce a solid, coverless, scuff-resistant, impact-resistant golf ball.

9. The method of claim 8 wherein said curing agent is selected from the group consisting of water and 4,4'-methylenebis-(2-chloroaniline).

References Cited by the Examiner
UNITED STATES PATENTS

| | | | |
|---|---|---|---|
| 2,484,397 | 10/1949 | Barton | 260—2.5 |
| 2,729,618 | 1/1956 | Muller et al. | 260—77.5 |
| 2,751,363 | 6/1956 | Martin | 260—9 |
| 2,764,565 | 9/1956 | Hoppe et al. | 260—77.5 |
| 2,797,201 | 6/1957 | Veatch et al. | 260—2.5 |
| 2,806,509 | 9/1957 | Bozzacco et al. | 260—2.5 |
| 2,917,489 | 12/1959 | Gladding et al. | 260—17.5 |
| 2,945,776 | 7/1960 | Conguisti et al. | 260—2.5 |
| 2,997,302 | 8/1961 | Smith | 260—5 |
| 3,060,989 | 10/1962 | Railsback et al. | 260—5 |
| 3,062,682 | 11/1962 | Morgan et al. | 260—2.5 |

OTHER REFERENCES

Fischer: "Nomenclature of Synthetic Rubbers," Industrial and Engineering Chemistry, August 1939, pp. 941–945.

MURRAY TILLMAN, *Primary Examiner.*

DONALD E. CZAJA, *Examiner.*